March 11, 1941.     H. E. LINDEMANN     2,234,377
CONTROL DEVICE
Filed Nov. 5, 1937      2 Sheets-Sheet 2
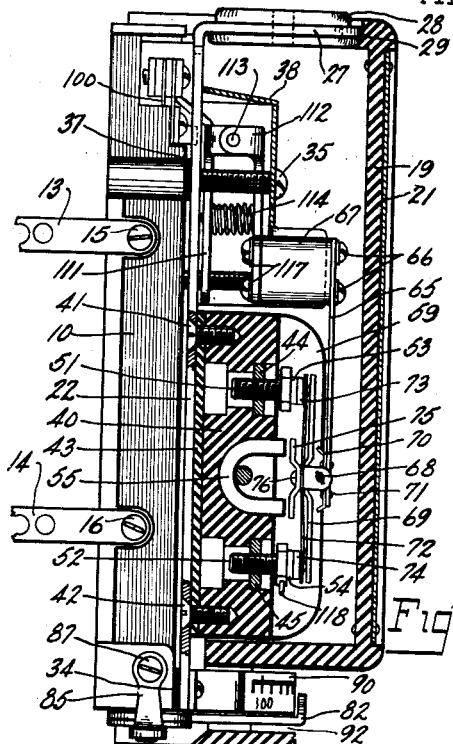
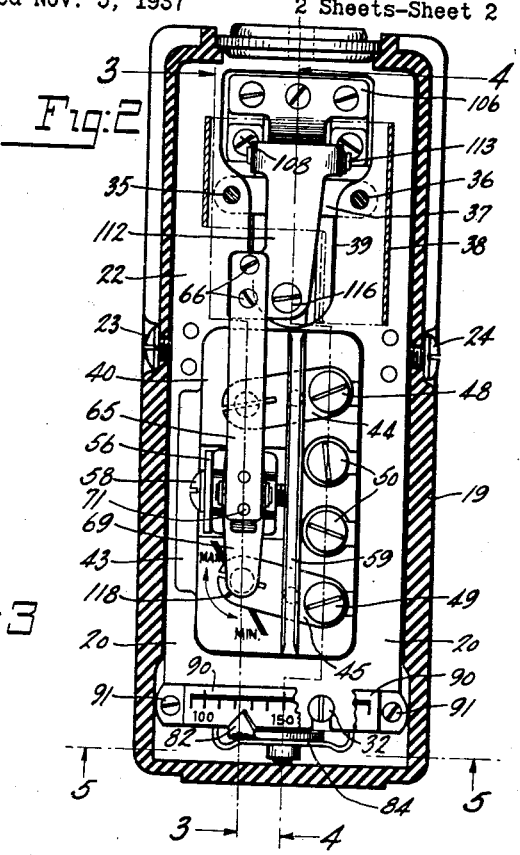
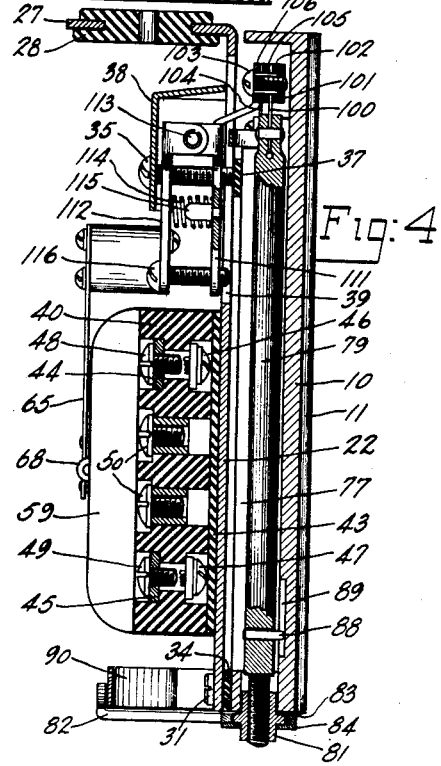
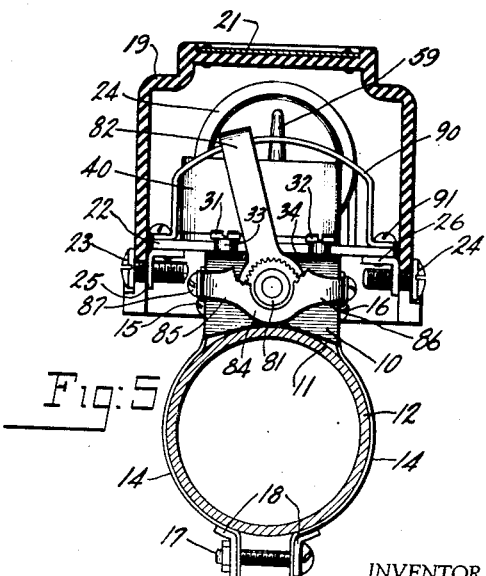
INVENTOR.
Herbert E. Lindemann
BY
ATTORNEY.

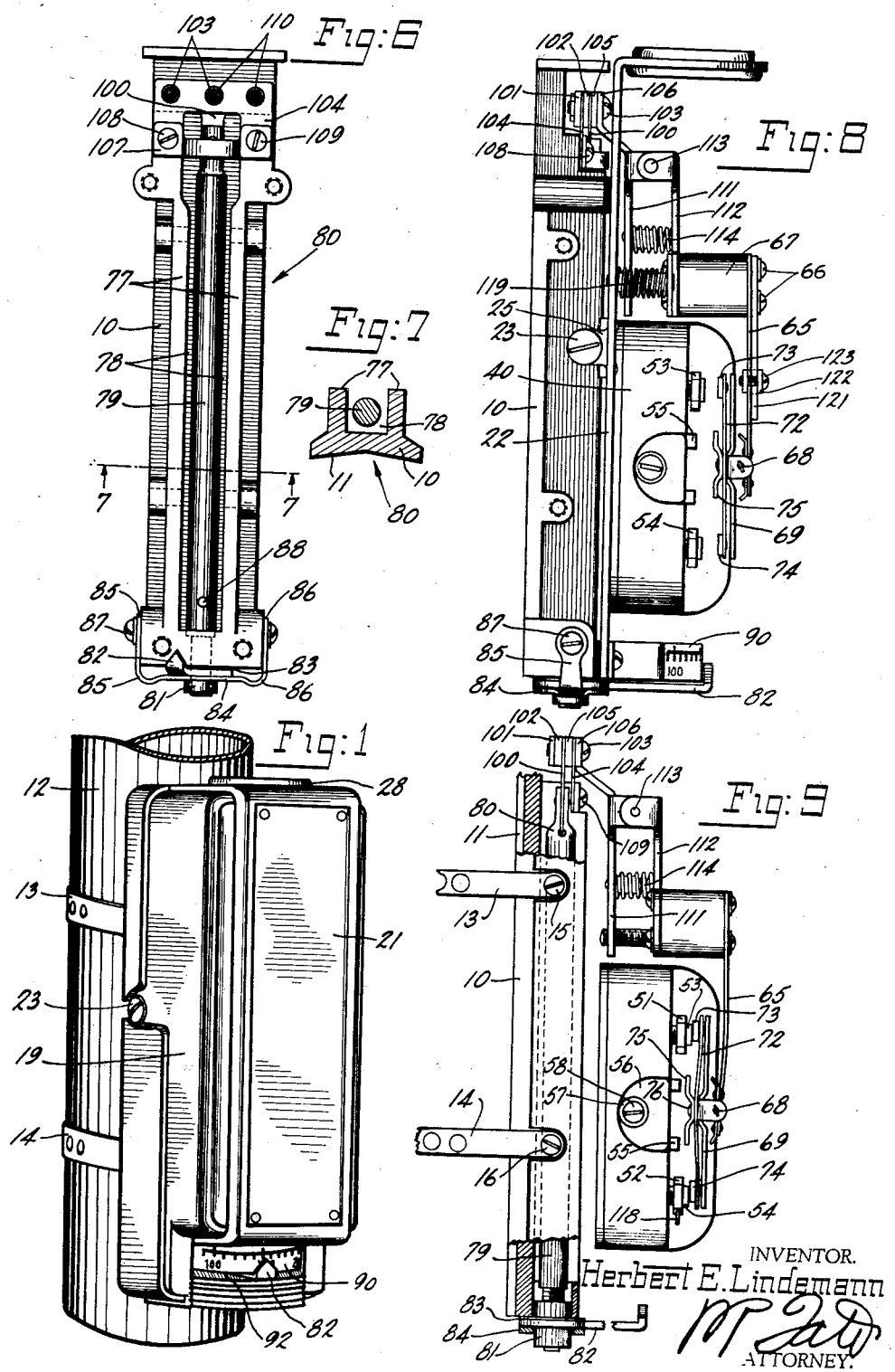

Patented Mar. 11, 1941

2,234,377

UNITED STATES PATENT OFFICE 2,234,377

CONTROL DEVICE

Herbert E. Lindemann, Milwaukee, Wis., assignor to Perfex Corporation, Milwaukee, Wis., a corporation of Wisconsin Application November 5, 1937, Serial No. 172,977

27 Claims. (Cl. 200—137)

This invention relates in general to control devices and more particularly to automatic control devices for use in air conditioning systems.

In air conditioning systems it is customary to have some form of heating plant such as a steam boiler or a hot water boiler to heat the air. These boilers are connected by means of pipes to radiators located in the space to be air conditioned. In some air conditioning systems it is customary to use either steam or hot water boilers to heat the air and then to circulate the heated air for air conditioning. It is also customary to use various forms of refrigerators for cooling purposes in order to maintain the air in the space at a comfortable temperature. This invention relates to an automatic control device which will respond to a physical condition such as the temperature of a boiler, radiator, refrigerator, etc., for the purpose of automatically controlling the operation of the air conditioning plant. In some air conditioning systems it is customary to use a hot water boiler and then use a pump for circulating the hot water to the space to be air conditioned. When such an arrangement is used it is desirable to have some automatic control device which responds to the temperature of the water and which will prevent the pump from operating if the temperature of the water is not sufficiently warm to heat the space.

The present invention is concerned with an automatic control device which is arranged to respond to the various temperature changes of an air conditioning system for the purpose of automatically controlling the operation of the system, and the principal object of the invention is to provide an improved control device for the aforesaid purpose which will function to regulate the air conditioning system in a more reliable and satisfactory manner.

A further object is to provide a control device which will be exceptionally sensitive to temperature changes and extremely accurate in operation so as to maintain the air conditioning system within any desired temperatures.

A further object is to provide a control device having a more simplified and accurate means of adjustment for regulating the response of the device at particular temperatures.

An additional object is to provide a control device in which the elements thereof are arranged in a more compact manner whereby ease of adjustment, accessibility, and assembly are more readily attained.

Another object is to provide an improved switching mechanism for a control device whereby dependable and uniform operation of the device is insured.

A further object is to provide an improved and more sensitive thermal responsive unit for use in automatic control devices.

Other objects and advantages reside in certain novel features of construction, arrangement and combination of the various parts which will be hereinafter more fully described and particularly pointed out in the claims.

It has been chosen to illustrate the invention in connection with an air conditioning system in which the automatic control device is associated directly with or strapped onto a riser or pipe so that the temperature of the water or steam passing through the pipe is effective to act upon the device which thereby controls the heating plant to either raise or lower the temperature of the air being conditioned. Other applications of the invention are contemplated such as that in which the control device is associated with some other form of heat radiation point or in which it operates to control valves and motors, or fans and other elements of an air conditioning system. It is likewise contemplated that the invention be applicable to conditioning systems in which the air to be conditioned is cooled instead of heated and the control device is therefore arranged to regulate the temperature of a space to the desired coolness. In another of its applications it is arranged to control the supply of domestic hot water in a household by shutting off the heater of a hot water tank when the domestic hot water temperature reaches a certain value, or if the heater is inadvertently allowed to operate, to shut it off and thereby prevent overheating.

Referring to the drawings which depict a preferred embodyment of the invention:

Fig. 1 illustrates in perspective a view of the control device in one of its applications;

Fig. 2 is a plan view of the device with the cover shown in section;

Fig. 3 is a cross-sectional side view taken along the line 3—3 of Fig. 2;

Fig. 4 is a cross-sectional side view along the line 4—4 of Fig. 2;

Fig. 5 is an end view of Fig. 1 taken along the line 5—5 of Fig. 2;

Fig. 6 is a plan view of the thermal element;

Fig. 7 is a cross-section of the thermal element taken along the line 7—7 of Fig. 6;

Fig. 8 is a side view of a modification of the control device arranged to close the switching mechanism instead of to open it as in Fig. 3; while Fig. 9 is a side view of the switching mechanism in one of its positions and with other elements partly in section.

Referring now particularly to Figs. 3 and 5, the control device includes some physical condition responsive means one element of which is here shown in the form of a heat responsive base 10 made of a metal having a relatively high coefficient of expansion. The material of which this base is constructed will be subsequently described in more detail. The base 10 is arranged with a V-shaped bottom 11 comprising two diverging surfaces so as to provide a universal contacting surface to fit against the side of various sizes of pipes, radiators, or risers such as the pipe 12 shown in Figs. 1 and 5, for example. In certain instances it may be required that the control device be mounted upon a flat heating surface in which case the bottom of base 10 would be formed flat instead of V-shaped. A pair of pipe straps 13 and 14 are fastened at one end to the sides of the base 10 by the strap screws 15 and 16, and the other ends of the straps extend around the pipe 12 and are clamped together by the strap bolts 17 and clamps 18, see Fig. 5, so that the control unit is securely clamped and mounted in position where the water or steam passing through the pipe will have a direct effect upon the base 10 by the conduction of heat through the walls of the pipe. A protective cover 19 for the control device which is preferably made of some molded plastic insulation product such as "Bakelite," completely encloses all but the rear and top sides of the unit. This cover has an ornamental metal name plate 21 fastened to its front surface by rivets at each of the corners. A flat metal mounting plate 22 arranged directly on top of, but slightly spaced from base 10 is provided with screws 23 and 24 threaded into lugs 25 and 26 on each side of the plate 22 for the purpose of removably fastening the protective cover 19 to the control unit. Slots and raised portions of the cover 19 permit the cover 19 to be removed without turning the screws 23 and 24 all the way out of the lugs. At its upper end the mounting plate 22 has a bracket portion 27 formed at right angles thereto with a hole therein in which a rubber grommet 28 is placed, or alternatively a conduit connection may be made to the bracket. The connecting wires for the control unit are fed through this bracket 27 and grommet 28 to the terminals of the control unit. The cover 19 is arranged with an opening at the top having a ledge 29 around it upon which the bracket 27 rests with a snug fit and without interfering with the connecting wires or the conduit.

The bottom of the mounting plate 22 is attached to the lower end of the base 10 by a pair of screws 31 and 32 having shoulder portions 33 extending freely through slots cut in the end of the mounting plate 22 as best seen in Figs. 2 and 5 so that upon the expansion or contraction of the base 10 the screws will slide longitudinally in the slots and still hold the mounting plate in position with their large heads. This arrangement prevents binding or buckling of the mounting plate 22 when the base 10 expands or contracts, and in order to reduce the sliding friction at the point where the plate and base 10 engage, a fiber spacing and insulated washer 34 is interposed under the screws 31 and 32. At its upper end the mounting plate 22 is rigidly fastened to the base 10 by a pair of screws 35 and 36 which thread into side projections formed in the base. A fiber washer 37 spaces the plate from the base slightly at this point. The spacing washers 34 and 37 serve to retard the conduction of heat from the base 10 to the mounting plate 22 and in addition provide a space between these two elements for air circulation. The screws 35 and 36 are of sufficient length that they can also clamp a thin protective metal cover 38 tightly to the top of the mounting plate 22, directly over an opening 39 cut in the plate 22 and through which certain operating elements extend from the base 10 as will hereinafter be pointed out.

Mounted on the front of plate 22 and actuated by the physical condition responsive unit is means for automatically controlling the physical condition to which the control responds, which means is here shown in the form of switching mechanism which is arranged to control the circuit of some air conditioning plant. The stationary portion of the switching mechanism of the control device includes as one of its elements a terminal supporting block 40 made of insulating material which is attached to the supporting plate 22 by means of counter-sunk screws 41 and 42, Fig. 3. A thin flat insulating plate 43 between the plate and the block covers terminal screw openings in the rear of the block. A pair of terminal plates 44 and 45 are inlaid in the top of the insulating block 40 and are held in position by holding screws 46 and 47 extending from the rear side of the block as shown in Fig. 4. A pair of terminal screws 48 and 49 thread into one end of the terminal plates 44 and 45 and serve for the connection of the incoming wires, while a pair of additional terminal screws 50 provide attaching means for auxiliary connecting wires if they are required. Adjustable contact studs 51 and 52 are threaded into split ends of the terminal plates 44 and 45 so as to tightly grip the studs and lock them in their adjusted position. The tops of the studs 51 and 52 are provided with fixed control elements or contact points 53 and 54, respectively, and these constitute the stationary or fixed contacts of the switching mechanism. Arranged in the insulating block and between the set of fixed contact points 53 and 54 there is a horse-shoe shaped permanent magnet 55 having its pole ends extending outward from the block. A clamping plate 56 is clamped against the magnet 55 by a washer 57 around a clamping screw 58 which threads into the side of the terminal block 40 to hold the magnet in place. In order to preclude the possibility of the connecting wires on the terminal screws 48, 49 and 50 from becoming entangled with the switching mechanism a barrier member 59 formed integral with the block 40 is arranged between the mechanism and the adjacent row of terminal screws.

The movable portion of the switching mechanism comprises a control or resilient operating arm 65 rigidly fastened at one end by the screws 66 to an insulating block 67, while the other end carries a pivot 68 to which a pair of turned up projections formed out of the rigid stop bar 69 are hinged. A stop plate 70 is held by rivets 71 to the underside of the resilient arm 65 and has turned up ends which may be engaged by the arm 69 if rotated too far. A flexible contact supporting member or bar 72 is arranged parallel to the rigid bar 69 and carries a pair of movable control elements or contact points 73 and 74 at its extreme ends which are arranged in operative relation to the fixed contact points 53 and 54 and cooperate therewith to effect the control condition. Adjacent the flexible bar 72 is an iron armature 75 which is positioned so as to be influenced by the permanent magnet 55. The armature is held at its midpoint together with the flexible bar 72 to the rigid arm 69 by the rivets 76 so that these elements can all swing about the pivot 68 within the limits defined by the stop plate 70. The switching mechanism is arranged so that when the contacts are in their closed position as shown in Fig. 3, the electrical circuit extends over a path from a wire (not shown) connected to terminal screw 48, through terminal plate 44, contact stud 51, contact points 53 and 73, rigid and flexible arms 69 and 72, contact points 54 and 74, contact stud 52, terminal plate 45, to the terminal screw 49 to which another connecting wire (not shown) is attached. The circuit therefore extends through both sets of fixed and movable contacts in series and consequently the opening of either set will break the electrical circuit. In this manner by bridging the fixed contacts with a movable arm supporting the moving contacts, the use of flexible lead wires or "pig tail" connections is eliminated. The exact manner in which the switching mechanism operates to open and close the contacts will be pointed out in more detail hereinafter in connection with the operation of the control device.

Base 10 has a pair of parallel projecting portions 77 which serve as reinforcing members and are formed integral therewith. These portions 77 extend for a substantial portion of the length of the base as seen in Fig. 6 and together with the bottom of the base form a recess 78 for accommodating an elongated metal rod 79 arranged coextensive therewith. This rod 79 is made of a metal alloy having a relatively small coefficient of expansion as compared to the heat responsive base 10. The particular alloy of which the rod 79 is composed will be hereinafter pointed out. The rod 79 and base 10 having widely different coefficients of expansion and contraction are associated together to form the thermo-responsive or actuating means 80 for the control device.

As shown in Figs. 6 and 7 the base 10 which serves as a support for the other elements of the control device constitutes the heat or temperature responsive portion of the thermo-responsive unit 80, while the rod 79 constitutes the relatively non-heat responsive portion of the thermal unit. It will be understood therefore that the use of the terms "heat responsive" and "non-heat responsive" and "expansible" and "non-expansible" elements is intended to refer to elements having a widely different coefficient of expansion.

At its lower end the rod 79 is provided with left-hand threads cut in it which are engaged by a threaded bearing 81 that is fastened to a temperature adjusting arm or pointer 82 by a spline connection as shown in Fig. 5 so that manual rotation of the pointer also turns the bearing 81 on the threads of the rod 79. A thin steel washer 83 between the bearing 81 and the end of the base 10 provides a good bearing surface when the pointer 82 is turned. In order to maintain the bearing 81 in position in the base opening and also prevent too loose a movement of the pointer 82, a spring washer 84 engages these elements and has extensions 85 and 86 on each side thereof which are attached to the sides of the base 10 as by screws 87. As the pointer 82 is moved to turn the bearing 81 in a clockwise direction the rod 79 is pushed upward because the spring washer 84 tightly holds the bearing 81 against the bottom of the base 10. To prevent rotation of the rod 79 as the bearing 81 is turned upon it, a small pin 88 is driven into the rod 79 and has its other end slidable in a vertical slot 89 cut in the base 10 as seen in Fig. 4. A calibrated temperature scale 90 is attached to the lower end of the mounting plate 22 by screws 91 in a position directly above the pointer 82 and indicates by the position of the pointer on the scale the temperature at which the control device operates. The scale 90 and pointer 82 are arranged in an opening 92 at the lower end of the cover 19 where they are visible and the pointer is accessible for manipulation from the outside of the cover.

The upper end of the rod 79 has a T-shaped steel spring hinge 100 riveted to it as best seen in Fig. 6. The horizontal top portion of the hinge 100 is clamped between metal washers 102 and 105 by screws 103 which thread into washer 101. A second steel spring hinge 104 formed into a U-shape is clamped between a metal washer 105 and a plate 106 by screws 103 and has its leg ends attached to the base 10 by a clamping plate 107 and screws 108 and 109. In order to provide a tight clamping fit between the spring hinges and metal washers and also to prevent uneven binding of the hinges small metal bushings 110 are provided around each of the screws 103.

An operating beam 111 is formed as part of the clamping plate 106 and extends over base 10 and through the opening 39 in the mounting plate 22. It has associated with it an auxiliary operating beam 112 of the same contour which is hinged to it by a hinge pin 113. Between the two beams a coil spring 114 is held in position by a stud 115 on the beam 112 and tends to force the beams apart, but this is prevented by an adjusting screw 116 which threads into the beam 112 and thereby adjusts the position of the beams with respect to one another. After the pointer 82 has been assembled on the bearing 81 the screw 116 is adjusted to initially calibrate the control device to respond to the temperature value indicated on the scale 90 by the pointer 82. Attached firmly to the auxiliary operating beam 112 by screws 117 is the insulating block 67 carrying the resilient operating switch arm 65.

The differential or difference between the temperature value at which the contacts close and that at which they open may be varied. This is accomplished as shown in Figs. 2 and 3 by applying a wrench to the head of the stud 52 carrying the fixed contact 54 and turning the stud within the limits of the arrows extending between the readings "max" and "min." A small pin 118 driven in the head of the stud 52 and painted red serves as an indicator for the adjustment. The turning of the stud 52 varies the gap between the magnet 55 and the armature 75 when the switching mechanism is in its closed position.

Referring again to the thermo-responsive unit 80 comprising base 10 and rod 79 it has previously been stated that this unit is composed of elements having widely different coefficients of expansion and contraction when subjected to the influence of temperature changes. While this is a factor of paramount importance in considering the choice of materials for the thermo-responsive unit other factors are equally desirable from an operating and practical viewpoint. For example, it is quite important considering the base 10 only that the thermal conductivity, specific heat and gravity of which it is composed be considered in arriving at a conclusion regarding a desirable material for this element. A material exhibiting the foregoing qualities to a certain degree is aluminum and another material commonly used is one made of brass. Both of these materials, however, are limited in their application for the purpose intended as will be pointed out. Applicant has found that by making the base 10 out of a material containing at least 80% magnesium and a small amount of aluminum and manganese, and expansible element is produced which exhibits the desirable properties to a highly marked degree and is superior to either aluminum or brass. Such a material is known to the trade as "Downmetal" and has been found to be very acceptable although slight variations in the amounts of the ingredients can be made without materially effecting the characteristics of the material to any great degree. Applicant has also found that if the magnesium content is increased to 90% or above and in some cases to as high as 99% the element exhibits some desirable characteristics over the 80% alloy. A comparison of the improved physical properties of the magnesium alloy over that of aluminum and brass will now be pointed out more specifically. The coefficient of thermal expansion per degree Fahrenheit for the magnesium alloy is of the order of .000016 while that of aluminum is .000013 and brass .000011, indicating that the alloy is considerably superior in this highly desirable property. The thermal conductivity in C. G. S. units for the magnesium alloy is 0.20, for aluminum is 0.50 and for brass 0.20, indicating that the magnesium alloy is as good in this property as brass. The extreme light weight of the magnesium alloy is apparent when it is seen that it has a specific gravity of only 1.81, while that of aluminum is 2.77 and brass 8.40. The specific heat value in calories per cubic inch per degree centigrade which is 7.3 for the magnesium alloy, 10.2 for aluminum, and 12.8 for brass, shows that the magnesium alloy is far superior in this important property. Other advantages presented by the use of the magnesium alloy are the ease with which it can be cast or wrought into the desired shape for use as a thermal element and base for the control device, its machinability and stability, and also its cheapness.

In order that the above superior qualities of the magnesium alloy base 10 may be fully taken advantage of it must be associated with another element or member such as rod 79 having a relatively low coefficient of expansion. Applicant has found that by using a material known as "Invar" comprising an alloy of 64% iron with about 36% nickel, that the satisfactory characteristics pointed out are evolved. This 36% nickel alloy has a coefficient of expansion per degree Fahrenheit of .0000005 up to about 300 degrees Fahrenheit which is relatively small as compared to the magnesium alloy.

The combination of the nickel-iron rod 79 with the magnesium alloy base 10 produces a thermo-responsive unit that is far superior to any previously known for actuating a control device. For temperatures above 300 degrees Fahrenheit it may be desirable to make the rod out of a nickel-iron alloy having a larger nickel content. The coefficient of expansion of this higher nickel content is greater than the 36% nickel but it remains constant over a greater temperature range. The rod 79 may be made out of iron, nickel, or "Monel" metal, however, these materials have a larger coefficient of expansion than the 36% nickel alloy.

With the aforesaid construction and arrangements of elements in mind the operation of the control device will now be considered in more detail, it being assumed that the device is securely strapped onto a riser or hot water pipe 12 as illustrated in Fig. 1, and with the switching mechanism in its closed position as seen in Fig. 3 so that the heating plant is caused to generate more heat and raise the temperature of the steam or water flowing through the pipe. The pointer 82, however, is first set to the desired temperature on scale 90 which predetermines the temperature at which the control device is to actuate the switching mechanism to its open position and cut off the heat. As the heat responsive base 10 is in direct contact with a portion of the surface of pipe 12 the increase in temperature of the fluid passing through the pipe is transmitted by heat conduction through the pipe walls to the base 10 of the thermo-responsive unit 80 which immediately begins to expand in a lengthwise direction. This expansive movement of the base 10 is transmitted at its bottom end to the lower end of the rod 79 which is non-heat responsive, and the rod therefore has a downward pull exerted on it through the medium of the bearing 81 as clearly seen in Figs. 4 and 9. This force is transmitted by the rod 79 to its upper end at the point where the spring hinge 100 is attached and as a result the hinge is pulled downward. The other end of the expanding base 10 at the same time exerts an upward thrust upon the other spring hinge 104 and as a consequence the operating beam 111 is swung outward. The spring hinges 100 and 104 act as a pivot or fulcrum for the beam 111. By interposing the metal washer 105 between the spring hinges 100 and 104 at their upper end, they are spaced apart a sufficient distance to permit them to operate freely as a fulcrum point for the operating beam 111 without acting in a manner tending to shear off the clamping screws 103 when opposing forces from the rod 79 and the base 10 are exerted upon them. In addition the thickness of metal washer 105 has been so calculated that it forms a separation for the spring hinges so that an amplified or greatly increased movement of the operating beam 111 takes place as compared to the small movement of the rod and base. In arranging the elements in the manner described it is seen that the expanding effect of both ends of the thermal unit 80 is utilized and added together to produce a relatively large movement of the operating beam 111 through the frictionless linkage of the spring hinges. The resilient operating arm 65, secured to the auxiliary beam 112 and which is movable with beam 111 opens the switching mechanism and the heating plant is thereby caused to discontinue its generation of heat. In case of excessive or abnormal expansion of the thermal element, the auxiliary beam 112 engages the underside of the protective cover 38 which thereby acts as a stop.

As the temperature of the fluid in the pipe 12 gradually drops, the base 10 correspondingly contracts and the stress previously exerted upon the rod 79 and the spring hinges 100 and 104 is accordingly relieved. The spring 84 maintains the lower end of rod 79 against base 10 and the operating beam 111 is thereby rotated inward with the spring hinges acting as pivots and the switching mechanism closes the contacts again. The exact point or temperature at which the contacts will re-open is determined by the differential setting as previously pointed out. By the foregoing operations it will be apparent that the manual movement of the pointer 82 across the scale to determine the point at which the switch is to open, turns the bearing 81 upon the threaded end of the rod 79, and because of the collar on the bearing abutting the end of the base 10, a certain amount of stress is preliminarily placed upon the rod 79 which is subsequently augmented by the expansion of the thermal unit 80. In this manner the exact point or temperature at which the switching mechanism opens the circuit may be accurately predetermined.

Returning now to the operation of the switching mechanism, as the operating beam 111 is rotated outward by the expansion of the base 10, the resilient operating arm 65 is first caused to bow slightly which is the result of the permanent magnet 55 exerting its magnetic influence upon the armature 75. As the resilient arm 65 continues to bend as shown in Fig. 9 the distance between the hinges 100—104 and pivot 68 is shortened and the flexible contact supporting arm 72, rigid arm 69 and the armature 75 are caused to move slightly in a linear direction so that the movable contacts slide or wipe for a short distance across the surfaces of the fixed contacts. The result of this wiping movement is that the contact surfaces are always maintained bright and clean and non-corrosive, and in the event that they become slightly welded because of the passage of excessive current between them, then this sliding movement will cause the weld to be broken. As the resilient arm moves further it shortly reaches a position in which the magnetic pull exerted by the magnet upon the armature is less than the pull of the resilient arm and as a consequence the contacts are opened with a snap action. However, due to the action of the flexible supporting arm 72 as the bar 69 and armature 75 move away from the magnet 55 the contacts remain closed a short interval after the balance of force between the resilient arm 65 and magnet 55 has been passed so that a better snap action is provided and fluttering of the contacts is obviated.

As the temperature of the base 10 is lowered the resilient arm 65 is caused to move the switching mechanism toward closed position and as the armature 75 comes within the magnetic influence of the magnet 55 the movement is accelerated causing a slight bending of the resilient arm 65 whereupon the contacts engage with a snap action. As the contacts engage the flexible arm 72 is bent slightly until the rigid arm 69 engages the rear of the contacts. This causes a slight wiping action to take place between the contacts. With the switching mechanism closed the magnet holds the contacts tightly in engagement regardless of the position in which the control device is mounted or of vibration to which the device may be subjected. In addition by providing a snap action and wiping effect upon the closing and the opening of the contacts the possibility of corroded and dirty contact surfaces and the formation of destructive arcs is greatly minimized.

The modification of the control device illustrated in Fig. 8 comprises an arrangement in which the device closes the switching mechanism instead of opening it in response to an expansion of the base 10. With a few minor exceptions the identical parts and elements are used in this modification as that constituting Fig. 1 and the parts are interchangeable. Comparing Figs. 8 and 9 it will be seen that in Fig. 9 the spring hinge 100 is clamped between the metal washers 102 and 105, and the other spring hinge 104 is clamped between metal washers 105 and 106. In Fig. 8 the positions of the spring hinges are exactly reversed with hinge 104 arranged between washers 102 and 105. In placing hinge 104 on the other side of 100 it is necessary to cut down the supporting ledge of the base 10 for accommodation of the screws 108 and 109 and clamping plate 107. The action of this reversed arrangement is such that upon an increase in temperature both ends of the base 10 move outward a slight amount and at the bottom end the rod 79 is pulled downward carrying the hinge 100 with it. At the upper end, the base 10 exerts an upward thrust on the hinge 104 with the result that the operating beam 111 is rotated inward and the switching mechanism caused to close the contacts. As soon as a drop in temperature takes place the base 10 gradually contracts so that movement of the hinges takes place in the reverse direction whereupon the contacts are opened with a snap action. In Fig. 9 the spring 84 is strong enough to move the switching mechanism from open to closed position, whereas in Fig. 8 spring 84 is not strong enough to move the contacts from closed to open position. Because of the influence of magnet 55 it requires considerable more force to move the contacts from closed to open position than it does to move from open to closed position. In view of this, it is necessary to insert a compression spring 119 between the bottom of the auxiliary operating beam 112 and the top of the mounting plate 22. This spring 119 assists spring 84 in moving the contacts from closed to open position.

In Fig. 8 there is also disclosed a modified form of differential adjustment. It will be recalled that in Fig. 1 the differential adjustment was made by turning the head of the contact stud 54 which thereby varied the gap between the armature 75 and magnet 55 when the contacts were closed. The differential adjustment modification of Fig. 8 is suitable where it is desirable to secure a wider differential than can be obtained by the differential adjustment shown in Figs. 1 to 7. This arrangement comprises a relatively stiff arm 121 attached at one end and on top of resilient arm 65 by the screws 66 threaded into block 67. A U-shaped clamping piece 122 with a clamping screw 123 clamps the resilient bar 65 and stiff arm 121 together. This clamp 122 in effect shortens the resilient arm 65 which makes it less resilient as a whole and thereby reduces the differential. By loosening screw 123 the U-shaped clamp 122 may be moved along the bars 65 and 121 to give any desired differential. The minimum differential is obtained by moving the clamp 122 to the free end of the stiff bar 121. The resilient bar 65 should be made somewhat more resilient in this modification than in the other figures.

From the foregoing it is seen that the improved control device incorporates a number of novel features which make it highly desirable as a control unit for an air conditioning system. Due to the construction of the thermal element the control follows temperature changes very rapidly and the conventional "lag" between temperature changes and the response of the unit has been considerably reduced. Also due to the arrangement and construction of the spring hinges, any lost motion is entirely eliminated and the effect of the thermal element is transmitted directly to the switching mechanism.

While a particular embodiment of the invention has been illustrated and described it will be apparent that the principles incorporated therein are capable of various modifications thereof and it is therefor desired that the invention be not restricted to the exact disclosure but only to the extent and scope of the appended claims.

What is claimed is:

1. A control device comprising, a thermal element associated with a heat transmitting surface and directly affected by temperature changes thereof, said thermal element comprising heat responsive and non-heat responsive members, means for connecting the members together at one end, separate spring hinges connected to each of the other ends of the members, means for clamping the free ends of the spring hinges together, said spring hinges movable with respect to one another responsive to an operation of said thermal element, and control means connected to the clamped end of said spring hinges and actuated by the movement thereof.

2. A control device comprising, a physical condition responsive means including relatively expansible and non-expansible members, said members connected together at one of their ends, a spring hinge member connected to the first member and movable thereby, a second spring hinge member connected to the second member, means for clamping both of said hinge members together so that the expansion of said first member is effective to establish a rotation of said clamping means with the spring hinge members acting as a fulcrum point, and control means actuated by rotation of said clamping means.

3. A control device comprising, a thermal element including heat and non-heat responsive members associated with heat transmitting means and effected thereby, said first member arranged coextensive with said second member and connected to one end thereof, means for adjusting the connection between said members to vary their relative positions, said adjusting means comprising a manually operated pointer threaded on said second member, a separate spring hinge extending from the other end of each member, switching mechanism, and a switch operating arm connected to the other ends of said spring hinges and operated by the expansion and contraction of said first member, said adjusting means determining the temperature at which said switching mechanism is operated.

4. A control device comprising, a physical condition responsive means including relatively expansible and non-expansible members, said members arranged coextensive with one another, adjustable means connecting said members at one end for varying their relative positions, separate pivot means connected to the free end of both of said members, an operating beam carried by both of said pivot means and actuated by the movement thereof, switching mechanism carried by said operating beam and actuated thereby, and means for adjusting the relative positions of said operating beam and said switching mechanism to calibrate the control device.

5. A control device comprising, a physical condition responsive means comprising relatively expansible and non-expansible members arranged parallel to one another, said first member having a longitudinal recess on one side thereof, a supporting plate arranged parallel with an attached to said first member for covering said recess, said second member connected at one end to said first member and arranged in said recess below said plate, pivot means arranged below the plate and connected to the free ends of said members, and a control operating arm attached to said pivot means and extending through said supporting plate to the front side thereof.

6. A control device comprising, a thermal element including a heat responsive base member having a recess extending lengthwise therein and a non-heat responsive elongated member arranged within the recess, said base member arranged to be supported upon a heat transmitting surface, a bearing member in one end of said base member having threaded engagement with one end of said elongated member, and an adjusting arm attached to said bearing member for turning it upon said elongated member to longitudinally move the position of the elongated member with respect to the base member, a spring member for holding said bearing member against the end of said base member while permitting it to be turned, controlling mechanism connected to the free ends of the base member and elongated member and operated thereby, and a temperature scale cooperating with the adjusting arm for predetermining the temperature at which said controlling mechanism will operate.

7. A control device comprising, a thermal element including a heat responsive base member and a non-heat responsive member arranged coextensive therewith, said base member having one surface arranged for mounting upon a heat transmitting surface, adjustable means connecting one end of said non-heat responsive member with one end of said base member, a mounting plate arranged coextensive with and directly supported on one end of said base member and arranged to permit sliding movement between the mounting plate and the other end of the base member when the thermal element operates, control mechanism supported on said mounting plate, an operating arm extending parallel to and through said plate to the front side thereof and arranged to operate said control mechanism, and means connecting said base member and said non-heat responsive member with said operating arm whereby the control mechanism is operated by the thermal element.

8. A control device comprising, physical condition responsive means including a relatively expansible base member and a relatively non-expansive member, a pair of operating beams, means for pivotally supporting one of the beams for actuation by both members of the condition responsive means, means for adjustably supporting the other beam upon the first beam so as to be movable therewith, a resilient operating arm secured to said second beam and movable thereby, a fixed control element supported on the base, a movable control element on the resilient operating arm actuated into operative relation with the fixed control element responsive to the movement of the operating beams, and magnetic means on the base cooperating with the resilient arm for imparting snap action to the actuation of the control elements.

9. A control device comprising, a physical condition responsive means including relatively expansible and non-expansible members, a pair of operating beams, one of said beams adjustably supported in unitary relationship with the other beam, means for pivotally supporting one of the beams in operative relation to one of the members of the condition responsive means for actuation thereby, stiff and resilient operating arms attached to the other of the beams and movable thereby, means for adjustably clamping the flexible arm to the stiff arm for varying the effective length of the flexible arm, a movable control element, a flexible bar supporting the movable element on the free end of the resilient operating arm, a fixed control element supported in operative relationship to the movable element, a rigid bar supported on the resilient arm for engaging the movable element after it engages the fixed control element, an armature supported on the resilient arm, a magnet arranged in a position to influence the armature, said magnet cooperating with the resilient arm and the flexible bar to provide snap action to the engagement and disengagement of the control elements, said rigid bar preventing the engagement of the armature with the magnet upon the engagement of the control elements.

10. A control device comprising, a pivoted operating beam, physical condition responsive means for operating said beam about its pivot, an auxiliary beam pivoted on said operating beam and arranged co-extensive therewith, tensioned means between said beams normally urging them apart, adjusting means on said beams for varying the separation of the beams against said tensioned means, a resilient operating arm attached to the auxiliary beam and movable thereby, a fixed control element, a movable control element on the resilient operating arm arranged in operative relation to the fixed control element, and magnetic means cooperating with the resilient operating arm to provide snap action to the operation of the control elements.

11. A control device comprising, a heat transmitting means and a thermal element consisting of a relatively elongated member having two diverging surfaces on one side thereof in direct contact with the heat transmitting means and two parallel projecting portions formed on the other side, together with an elongated second member arranged between the projecting portions coextensive with the first member, control mechanism for controlling the temperature of said heat radiation means, and means connecting said control mechanism with said thermal element for actuation thereby.

12. A control device comprising a base member having a surface on one side thereof supported in direct contact with a heat transmitting surface, parallel spaced projecting portions formed along the other side of the base member and coextensive with said base member, a second member arranged coextensive with said base member and between said projecting portions, said members having relatively different coefficients of expansion, control mechanism connected to both of said members and arranged to be actuated by the expansion and contraction of said members, and means for regulating the temperature point at which the control mechanism is actuated.

13. A control device comprising, an elongated base member having two diverging surfaces for contacting with a heat transmitting surface, a second member arranged coextensive with said base member, one of said members having a higher coefficient of expansion than the other, a pivoted operating beam, means connecting both of said members to said operating beam whereby the expansion of the one member actuates the operating beam about its pivot, a resilient arm carried by the operating beam, movable control elements on said resilient arm, fixed control elements on said base member arranged in operative relation to the movable control elements, a permanent magnet on the base and an armature on the resilient arm arranged to be influenced by the magnet, said magnet and armature cooperating with said resilient arm to impart snap action upon the association and disassociation of the control elements, and means for adjusting the temperature point at which said control elements are actuated.

14. A control device comprising, an elongated base member having a generally V-shaped surface forming two longitudinal faces arranged to contact with the surface of a curved heat transmitting surface, said base member expanding and contracting in a longitudinal direction when subjected to temperature changes, a relatively non-expansible member associated with said base member, an operating beam, pivot means connecting said operating beam and both of said members, said members cooperating to actuate said operating beam about said pivot means, a resilient arm actuated by said operating beam, and switching mechanism operated by said resilient arm.

15. A control device comprising thermal responsive means including a magnesium alloy base member containing magnesium as the major ingredient, and a relatively non-expansible member, an operating beam, means for pivotally connecting said beam to each of said members for actuating thereby, a resilient operating arm actuated by the beam, a movable contact, means supporting said movable contact for movement by the resilient arm, a fixed contact supported upon the base in operative relation to the movable contact, an armature on the resilient arm, and a magnet on the base arranged in magnetic relation to the armature and cooperating with the resilient arm for providing snap action to the opening and closing of the contacts.

16. A control device comprising an elongated temperature responsive means including a magnesium alloy base member having magnesium as the major ingredient, said base member adapted to expand and contract in a longitudinal direction responsive to temperature changes, a resilient operating arm, a movable control element actuated by said operating arm, a fixed control element on said base member in operative relation to said movable control element, a relatively non-expansible member associated with said expansible base member, pivoting means connecting said operating arm with the base member and with the non-expansible member, said members cooperating to actuate said operating arm about its pivoting means to effect the engagement and disengagement of said control elements, and means cooperating with said operating arm for imparting snap action to the movement of the movable control element.

17. A control device comprising a temperature responsive means including an expansible and a relatively non-expansible member arranged coextensive therewith, means for adjustably connecting said members together at one of their ends, a flat spring hinge extending from the opposite end of each member, a spacing member secured between the free ends of the spring hinges, the relative movements of said members being effective to move and flex said spring hinges relative to each other whereby a rotative movement of said spacing member is effected, and a control arm secured to the ends of the spring hinges together with the spacing member and movable therewith, said spacing member being of a thickness such that an amplified movement of the control arm is brought about compared to the relative movements of the expansible and relatively non-expansible members.

18. A control device comprising a physical condition responsive means including relatively expansible and non-expansible elongated members arranged parallel to each other, means for connecting said members together at one of their ends, a U-shaped spring hinge having both legs connected to the free end of one of the members, a T-shaped spring hinge having its one leg connected to the free end of the other member, said spring hinge legs arranged adjacent to each other and movable with respect to one another responsive to the actuation of said members, a spacing member rigidly clamped between the free ends of said spring hinges, a control arm connected to the free ends of the spring hinges, the thickness of said spacing member being effective to enable the spring hinge legs in their relative movements to establish a pivoted rotation of said spacing member to actuate the control arm, the spacing member producing an amplified movement of said control arm compared to the relative movements of said expansible and non-expansible members.

19. In a control device an elongated thermal element comprising a heat responsive and a non-heat responsive member, adjustable means connecting the members together at one of their ends, said adjustable means comprising a bearing member threaded upon one of said thermal members and having bearing engagement with the other thermal member, an adjusting arm attached to said bearing member whereby the bearing member is adapted to be rotated to vary the adjustment between the thermal members, a spring member engaging the bearing member for maintaining the bearing member in its adjusted position, a switch operating arm, spring hinge members extending from the other ends of said thermal members, means for connecting the spring hinges with the switch arm whereby the switch arm is operated at the setting of the adjusting arm in response to the actuation of the thermal element, and means on the switch arm for calibrating its operation in accordance with the adjustment of the adjusting arm.

20. In a control device, a main operating beam and an auxiliary operating beam, said beams arranged in substantially spaced parallel relationship, pivot means connecting one end of the main beam to one end of the auxiliary beam so that the opposite ends of the beams are free, a spring arranged between both beams normally urging their free ends apart about the pivot, adjusting means connecting the free ends of the beams to vary the separation of the free ends, a contact operating arm carried by the free end of the main beam, a fixed contact engageable by the contact arm, actuating means connected to the pivoted end of the auxiliary beam whereby both beams are actuated together to effect the engagement of the contact arm with the fixed contact, and magnetic means for effecting snap action to the contact closure.

21. In a control device, a thermal element including an elongated expansible base member having a recess formed along one side thereof, a relatively non-expansible member arranged within the recess, adjustable means connecting the ends of said base member and non-expansible member together, a control arm connected between the free ends of the base member and non-expansible member and actuated by the relative movements of the same in response to temperature changes, said adjustable means comprising a bearing member engaging the base member and threaded upon a portion of the non-expansible member, a manual adjusting pointer secured to the bearing member for varying the connection between the base member and non-expansible member whereby the temperature point at which the control arm is actuated is predetermined, and cooperable engaging means on said base member and said non-expansible member for preventing tortional movement of the non-expansible member when an adjustment is being made.

22. A control device comprising, a thermally responsive means including an elongated expansible member made of an alloy containing at least 80% magnesium and an elongated relatively non-expansible member, said members being connected together at one of their ends, a spring hinge member connected to the first member and movable thereby, a second spring hinge member connected to the second member, means for clamping both of said hinge members together at their other ends so that the expansion and contraction of said first member is effective to establish a rotation of said clamping means with the spring hinge members acting as a fulcrum point, and control means connected to said clamping means and operated thereby.

23. A control device of the character described adapted to be placed in heat transfer relationship to a heat transmitting surface so as to be directly affected by temperature changes of said surface, said control device comprising an elongated base made from a magnesium alloy having magnesium as the major ingredient thereof, said base member being adapted to be secured with one surface thereof in a contacting heat transfer relationship to such a heat transmitting surface and to expand and contract in a longitudinal direction in response to temperature changes of said heat transmitting surface, an elongated relatively non-expansible member connected at one of its ends to a corresponding end of said base member, an operating arm pivotally secured at spaced points to the other end of said base member and to the other end of said non-expansible member and extending laterally with respect to said members whereby expansion or contraction of said base imparts rocking movement to said operating arm about one of said pivotal connections, a stationary control member mounted on said base, and a movable control member for cooperation with said stationary control member and moved into and out of operative relation to said stationary control member by said pivotal movement of said operating arm.

24. A control device of the character described adapted to be placed in heat transfer relationship to a heat transmitting surface so as to be directly affected by temperature changes of said surface, said control device comprising an elongated base made from a magnesium alloy having magnesium as the major ingredient thereof, said base member being adapted to be secured with one surface thereof in a contacting heat transfer relationship to such a heat transmitting surface and to expand and contract in a longitudinal direction in response to temperature changes of said heat transmitting surface, a stationary control member mounted in a fixed position on said base, a movable control member for cooperation with said stationary control member, and an elongated relatively non-expansible member operatively connected at its opposite ends to the corresponding ends of said base and operatively associated with said movable control member to shift said movable control member into and out of operative relation to said stationary control member in response to temperature induced changes in the length of said base.

25. A control device adapted for surface mounting upon a pipe, comprising a base member of good heat-conducting and relatively expansible material having an elongated recess formed to provide intimate, heat-transmitting contact between the outer surface of a pipe and said base at a plurality of points within the recess to cause said base member to change in temperature rapidly upon changes in temperature of the pipe, a relatively non-expansible member extending along said base member and attached thereto near one end thereof, an operating beam, pivot means near the opposite end of the base member and associating said operating beam with both of said members to cause rotation of said operating beam upon relative expansion or contraction between said members, and switching mechanism operated by movements of said operating beam.

26. A control device adapted for surface mounting upon a pipe, comprising a base member of good heat-conducting and relatively expansible material having an elongated recess formed to provide intimate, heat-transmitting contact between the outer surface of a pipe and said base at a plurality of points within the recess to cause the major portion of its mass to be in close proximity to the pipe whereby to cause said base member to change in temperature rapidly upon changes in temperature of the pipe, a relatively non-expansible member extending along said base member, control point adjusting means comprising adjustable attaching means near one end of said base member for holding said base member and one end of the non-expansible member in fixed relation, scale and pointer means cooperating to indicate the setting of said control point adjusting means, pivot means near the opposite end of the base member and associating said operating beam with both of said members to cause rotation of said operating beam upon relative expansion or contraction between said members, and switching mechanism operated by movements of said operating beam.

27. A control device adapted for surface mounting upon a pipe, comprising a base member of good heat-conducting and relatively expansible material having an elongated recess formed to provide intimate, heat-transmitting contact between the outer surface of a pipe and said base at a plurality of points within the recess to cause the major portion of its mass to be in close proximity to the pipe whereby to cause said base member to change in temperature rapidly upon changes in temperature of the pipe, a relatively non-expansible member extending along said base member, control point adjusting means comprising adjustable attaching means near one end of said base member for holding said base member and one end of the non-expansible member in fixed relation, scale and pointer means cooperating to indicate the setting of said control point adjusting means, pivot means near the opposite end of the base member and associating said operating beam with both of said members to cause rotation of said operating beam upon relative expansion or contraction between said members, a switching mechanism, means for operating said switching mechanism with snap action including a resilient motion transmitting means, said operating beam operating said switching mechanism through said resilient motion transmitting means.

HERBERT E. LINDEMANN.

CERTIFICATE OF CORRECTION.

Patent No. 2,234,377.　　　　　　　　　　　　　　　　　March 11, 1941.

HERBERT E. LINDEMANN.

It is hereby certified that error appears in the printed specification of the above numbered patent requiring correction as follows: Page 4, first column, line 20, for " "Downmetal" " read --"Dowmetal"--; page 6, second column, line 5, claim 5, for "an" read --and--; page 7, second column, line 40, claim 15, for "actuating" read --actuation--; and that the said Letters Patent should be read with this correction therein that the same may conform to the record of the case in the Patent Office.

Signed and sealed this 13th day of May, A. D. 1941.

(Seal)　　　　　　　　　　　　　　　　　　　　　　Henry Van Arsdale,
　　　　　　　　　　　　　　　　　　　　　　Acting Commissioner of Patents.